Patented Oct. 3, 1950

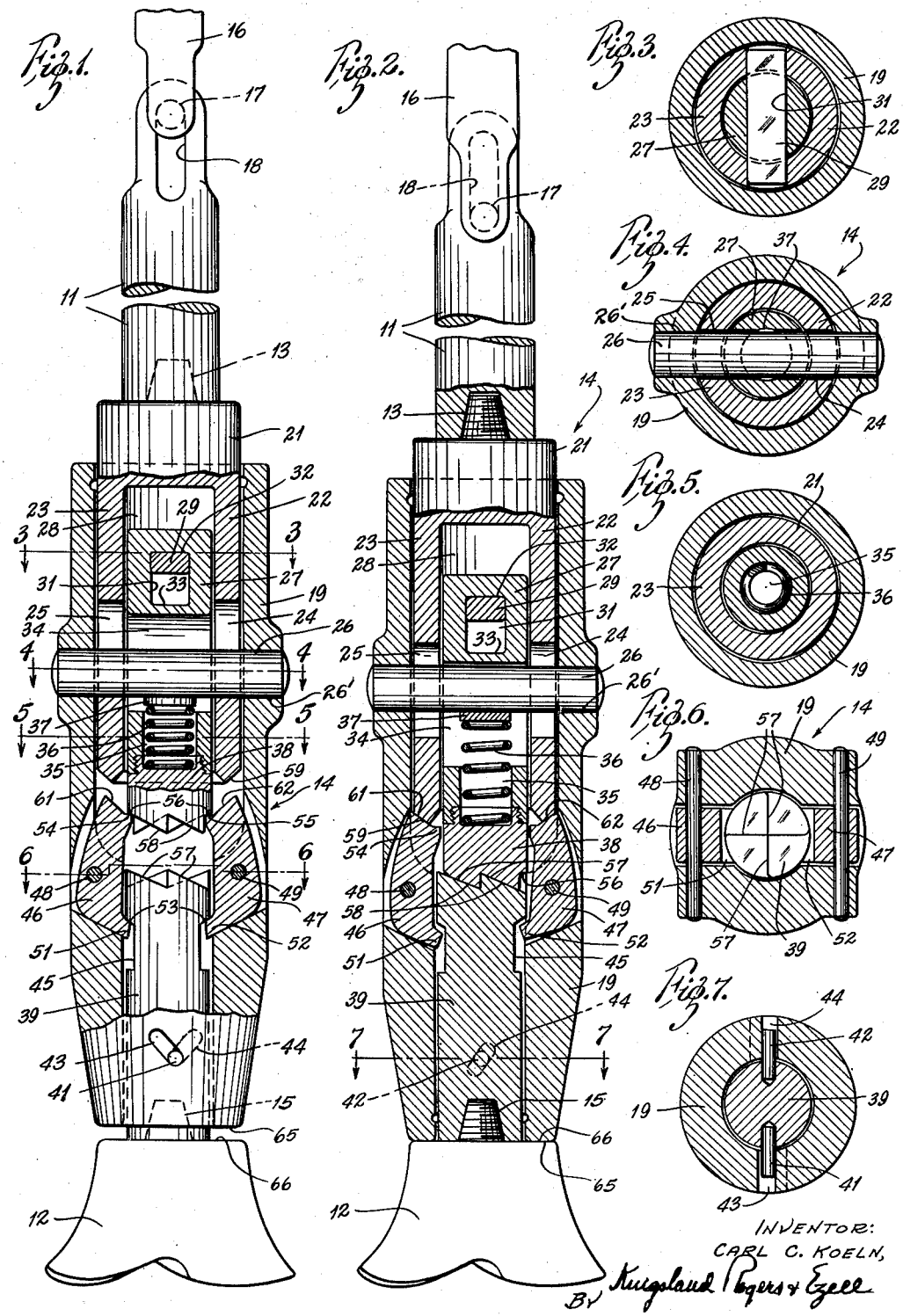

2,524,707

UNITED STATES PATENT OFFICE 2,524,707

DRILL

Carl C. Koeln, St. Louis, Mo.

Application October 24, 1945, Serial No. 624,305

8 Claims. (Cl. 255—27.1)

1

This invention pertains to drilling devices generally, and concerns itself more particularly with a double action earth drill for use with churn drilling apparatus.

The use of churn drills in earth boring operations, such as the sinking of deep wells, is well known in the art. The equipment used consists of a cutting tool, or drill, attached to a rope or steel cable, by means of which it is alternately hoisted and abruptly droopped through a given distance. Powered machines are usually employed to manipulate the drill, which, for oil drilling operation, weighs in the order of a ton or more.

The drill, per se, with which the instant invention deals, is an elongated metal shaft, commonly termed a shank, which ends in a sharp bit providing the cutting portion of the tool. The repeated percussive strokes of the bit against the substance being drilled (primarily rock) effect the cutting action, and, after each few feet of drilling, the cuttings are removed from the bore. For easy replacement of a worn bit, this part of the drill is detachable from the shank.

It is a general aim of the invention to provide an improved drill of the type described having for its end result greatly increased drilling efficiencies.

More specifically, it is an object of the invention to provide a drill capable of producing a percussive stroke in addition to, and approximately equaling, its gravity stroke for the same amount of power as was formerly expended in producing the gravity stroke alone.

Defining the general objects in specific terms, it is a purpose of the invention to provide a drill having a spring driven hammer releasable after the delivery of the drill's initial gravity blow for imparting a second cutting force to the drill bit and simultaneously effecting its rotation.

Another purpose of the invention is to provide a device capable of carrying out the foregoing objects which is adaptable to presently employ drills of the type described.

Still another object of the invention is to provide a rock drill capable of delivering an initial blow for setting its bit followed by a second blow for rotating the bit to produce a chipping action.

A still further object of the invention is to provide a drill adaptable for use as a churn drill in which a force is stored during its lifting stroke for subsequent release after the drill's gravity stroke.

Other objects and advantages will become apparent as the description proceeds, and a more comprehensive understanding of the invention will be afforded from the following detailed description when considered in conjunction with the accompanying drawing, in which:

Fig. 1 is an elevational view, in partial vertical section, of a drill embodying the instant invention showing the relative positions of its parts upon completion of its upward stroke;

Fig. 2 is a view similar to that of Fig. 1 showing the relative positions of the drill's parts upon completion of its downward stroke; and Figs. 3 to 7, inclusive, are cross-sectional views of the drill illustrated in Figs. 1 and 2, taken along the lines indicated.

In the form illustrated in the drawings, the invention is represented by an adaptation for use with presently used drills comprising a shank 11 and a drill bit, or cutting tool, 12, which latter element may be screwed into the shank at 13. As contemplated in this form, a hammer assembly 14 embodying the instant invention is attached to the shank at 13 and the bit 12 is, in turn, attached to this assembly at 15. It will be apparent to the reader, however, that the invention need not be so applied, but may be made as a unit. In such case, the shank 11 and the bit 12 will conform exactly with those shown, the only probable difference being that of the size of the shank 11. This minor difference will be explained later, at a more appropriate place in the description.

With the understanding that the invention does not necessarily contemplate an "adapter" for any drill, it will be described as comprising the shank 11 and the bit 12 between which is interposed the hammer assembly 14.

The shank 11 may be thought of as an elongated metal shaft provided with a cable coupling 16 to which a cable is attached and by means of which the entire drill is raised and lowered by churn drilling apparatus to perform its drilling operation. The cable coupling 16 is connected with the shank 11 by means of a pin 17 and slot 18 arrangement which provides for lost motion between the coupling 16 and the shank 11. In the embodiment illustrated, the hammer assembly 14 comprises a casing 19 which partially encompasses a bell 21 connectable with the shank 11 at 13. The walls 22 and 23 of the bell 21 are broken, respectively, by two slots 24 and 25 in which a pin 26, extending from and heading in openings 26' in the walls of the casing 19, is slidable. Located internally of the bell 21 is a hammer member 27 which is movable vertically within certain limits in a bore 28 therein. The limits of movement of the hammer 27 are determined by a crossbar 29 extending across the bore 28 of the bell 21. This bar enters a vertically extending slot 31 in the hammer 27, the top face 32 of which rests on the bar 29 when the drill is being raised. A bottom face 33, together with the undersurface of the bar 29, provide a stop for the bell 21 on its downward stroke.

The hammer member 27 is also provided with a vertically extending slot 34 through which the pin 26 extends. This slot is substantially complementary with the slots 24 and 25 in the walls of the bell 21.

Retained within an internal bore 35 in the hammer member 27 is a compression spring 36 which seats, in one instance, against the bottom of the bore 35 and, in a second instance, against a bearing plate 37 movable against the pin 26. A section 38 of the hammer member 27 is threaded to be screwed onto the latter member and is thus removable therefrom. This expedient provides for the easy installation of the compression spring 36 within the hammer.

Slidable also within the casing 19 is a bit mounting member 39 to which the drill bit 12 is attached at 15. The drill mounting member 39 is attached to the casing 19 by means of a plurality of pins 41 and 42 projecting outwardly from the shank thereof into obliquely aligned slots 43 and 44 cut in the walls of the casing 19. These slots, the purpose of which will be described later, provide for the vertical movement of the member 39 within the casing 19, and, when the drill is being lifted upwardly, the pins 41 and 42 attain positions at the bottom of their respective slots 43 and 44.

The member 39 is also fashioned with a reduced section 45 which accommodates extensions of a pair of trigger bell cranks 46 and 47 retained within the walls of the casing 19 and arranged to provide triggers for locking the hammer member 27 in a position within the bell 21 to deliver a power stroke to the bit mounting member 39.

The triggers 46 and 47 are pivoted, respectively, on pins 48 and 49 about which they are movable to perform their desired function. The trigger 46 has an extension 51 projecting into the reduced section 45 of the member 39. Likewise, the trigger 47 has an extension 52 similarly projecting. Each of these extensions is shaped to form complementary cam surfaces with a cam surface 53 on the member 39. At their upper ends, both of the triggers 46 and 47 are shaped to form locking projections 54 and 55 which are engageable against a shoulder 56 on the member 38 to lock the hammer member 27 in its cocked position.

To provide rotation for the bit mounting member 39 and, incidentally, the drill bit 12, the former member is fashioned at its upper surface with a plurality of cam teeth 57 which, at a fixed relative position of the various parts of the drill to be more fully described, are complementary with a similar group of cam surfaces 58 fashioned on the undersurface of the movable section 38 of the hammer 27.

To provide a releasing force for the trigger mechanisms 46 and 47, the lower face of the bell 21 is fashioned with a cam surface 59 which is brought into engagement with a cam surface 61 on the trigger 46 and a cam surface 62 on the trigger member 47.

With the aforedescribed arrangement of the parts, it is apparent that the bell 21 is vertically movable within the casing 19, as is the bit mounting member 39. Similarly, the hammer member 27 is vertically movable within the bore 28 of the bell 21. Further, through the pin and slot arrangement for connecting the bit mounting member 39 with the casing 19, the former is rotatable within the latter in a plane normal to the axis of the entire drill assembly. The relative movement of these parts will now be described in connection with the drill's operation.

*Operation*

With the drill device assembled as illustrated in Fig. 1, it is attached to the cable of the churn drilling apparatus by means of the coupling 16. Under the lifting action of the drilling apparatus, the entire assembly is raised through a given distance from which point it is abruptly dropped to deliver the drill bit 12 with a gravity blow. On the upward stroke, the weight of the casing 19, together with that of the bit mounting member 39 and the drill bit 12, provides a gravity load which is transmitted by means of the pin 26 against the spring seat member 37. The lifting forces acting through the shank 11 are transmitted through the crossbar 29 to the surface 32 of the hammer member 27, and the latter is raised causing relative movement with the bell 22. As the hammer member 27 is moved upwardly by the action of the crossbar 29, the pin 26 is movable downwardly within the slots 24 and 25 of the bell 21, thereby compressing the spring 36 as illustrated in Fig. 1.

Simultaneous with the compressing action on the spring 36, the weight of the bit mounting member 39 and the drill bit 12, acting through its cam surface 53 against the extensions 51 and 52 of the triggers 46 and 47, rotates these latter members inwardly to draw their locking extensions 54 and 55 into engagement with the shoulder 56 on the hammer member 27 and thereby locks the same against movement under the compressive forces of the spring 36. The foregoing action may be described as that of cocking the drill, and is completely accomplished on the lift stroke thereof.

When the drill is raised to a certain position by the drilling apparatus, it is abruptly dropped, and, through the weight of the entire assembly, the drill bit 12 is moved against the object to be drilled with a gravity blow. As the drill bit 12 impinges against such an object, a lower extension 65 of the casing 19 is moved into contact with a shoulder 66 on the drill bit 12, and the pins 41 and 42 are cammed within their respective slots 43 and 44 to rotate the bit mounting member 39 in a manner such that its cam surfaces 57 will be positioned to receive the cam surfaces 58 of the hammer 27. In this manner, and when the two are brought together, rotation of the drill bit 12 will be effected in a plane normal to the longitudinal axis of the drill.

When the casing member 19 is stopped in its downward path, relative motion between it and the bell 21 is possible, and the bell 21 continues to slide downwardly with respect thereto. Under this action, the cam surface 59 on the lower extension of the bell 21 is moved by the entire weight of the assembly extending thereabove against the cam surfaces 61 and 62 of the triggers 46 and 47, respectively, which action moves them about their pivot points outwardly to withdraw the locking extensions 54 and 55 from the shoulder 56, thereby releasing the hammer member 27 for movement under the expansive forces of the spring 36. This latter action delivers to the bit mounting member 39 a hammer blow which is transmitted therethrough to the bit 12. In addition to the blow thus delivered, the drill bit 12 is rotated through a slight angle under the action of the cam surfaces 57 and 58 which gives to it an additional chipping action.

It is to be pointed out, here, that through the free action of the hammer 27, with respect to the bell member 21, no destructive force is applied to the cable supporting the drill when the hammer delivers its power stroke. The cable has become slack on the initial downward stroke of the drill assembly and, thereafter, the hammer 27 merely slides in the bell member 21, thus preventing the cable from receiving a sudden jerk which might otherwise break it.

It will be apparent that the weight of the bit-mounting member 39 and the drill bit 12, together with the casing 19, must be somewhat in excess of the compressive forces of the spring 36; that is to say, if the compressive forces of the spring 36 are in the order of 1500 pounds, the weight of the aforementioned assembly must be something in excess of this amount. It was with respect to this requirement that the minor difference in the relative sizes of the shank 11 were mentioned. In present drilling apparatus, the shank 11 and the drill bit 12, together, usually weigh in the order of a ton. If a compression spring of 1500 pounds is used, the hammer assembly would necessarily add an additional weight to that of a conventional shank sufficient to provide a cocking force for the spring 36.

In summation, the instant invention provides means for storing energy on the lift stroke of the drill which heretofore has been dissipated as waste energy, or at least has not been utilized. Thus, the instant invention is operable to provide an initial gravity blow equivalent to the weight of the apparatus dropped and to thereafter apply a power stroke to the drill bit in addition to that of the gravity stroke approximately in the order of its quantitative value. Also, the bit is given a rotative movement which adds an additional cutting force to the tool to thereby greatly increase overall drilling efficiencies.

While a particular embodiment of the invention has been illustrated and described, it is apparent that the same is subject to other changes and modifications. Accordingly, the representations and descriptions herein made are to be considered as illustrative only and not in a limiting sense, and the invention is to be defined solely by the appended claims.

What is claimed is:

1. In combination, in a double blow drill construction, a casing, a bit attachment member reciprocably mounted in said casing, a hammer member reciprocably mounted in said casing adapted to be moved into drilling impact engagement with said bit attachment member, means mounted within said casing for attachably receiving a drop cable, releasable power means within said casing and above said bit attachment member for moving said hammer member into drilling impact engagement with said bit attachment member, means within said casing for releasably restraining said power means, and means within said casing engageable with said restraining means for releasing said restrainng means and therethrough said power means immediately following drilling impact of said bit attachment member.

2. A double blow cable drill construction as set forth in claim 1 and including means for restoring said power means to hammer member moving position effective during the cable lift of said drill construction.

3. A double blow cable drill construction as set forth in claim 1 in which said hammer member is movable relative to said means for attachably receiving a drop cable to insure against snapping of the drop cable upon drilling actuation of said power means.

4. A double blow cable drill construction as set forth in claim 1 in which said power means comprises a strong resilient member which is under compression when restrained and which expands to exert a drilling force on said hammer member when released.

5. In combination, double blow cable drill construction comprising a sleeve, a bit mounting member disposed in said sleeve for limited reciprocative movement relative thereto, a cable attachment member disposed in said sleeve for limited reciprocable movement relative thereto, said members being in axial alignment, a hammer member in said sleeve concentric with said cable attachment member and in axial alignment with said bit mounting member, said hammer member being axially movable both with said cable attachment member and relative thereto, said hammer member being axially movable into striking engagement with said bit mounting member, power means for moving said hammer member into striking engagement with said bit mounting member, releasable means normally maintaining said power means against hammer moving action, and means for releasing said releasable means immediately following drop drilling impact of said bit mounting member so that said power means is effective to drive said hammer member against said bit mounting member with drilling effect.

6. In combination, double blow cable drill construction comprising a sleeve, a bit mounting member disposed in said sleeve for limited reciprocative movement relative thereto, a cable attachment member disposed in said sleeve for limited reciprocable movement relative thereto, said members being in axial alignment, a hammer member in said sleeve concentric with said cable attachment member and in axial alignment with said bit mounting member, said hammer member being axially movable both with said cable attachment member and relative thereto, said hammer member being axially movable into striking engagement with said bit mounting member, power means for moving said hammer member into striking engagement with said bit mounting member, releasable means normally maintaining said power means against hammer moving action, means for releasing said releasable means immediately following drop drilling impact of said bit mounting member so that said power means is effective to drive said hammer member against said bit mounting member with drilling effect, and means for restoring said power means to releasably maintained position during cable lifting of said drill construction.

7. A double blow cable drill construction like claim 5 in which said power means comprises a strong resilient member which is under compression when restrained and which expands to exert a drilling force on said hammer member.

8. In combination, drill construction comprising an outer sleeve, a bit mounting member within said sleeve having limited reciprocal axial movement relative thereto, a bell member within said sleeve having limited reciprocative axial movement relative thereto and being spaced axially from said bit mounting member, a hammer member axially reciprocatable within said bell member and extending therefrom towards said bit mounting member, a heavy spring within said hammer member, diametrically aligned apertures in said outer sleeve, diametrically aligned axially extending slots in said bell member, a diametric axially elongated opening in said hammer member, a pin mounted in said apertures and extending through said slots and opening, said bell member being freely reciprocable axially relative to said pin for the length of said slots therein, said spring having one end against said pin and the other end against said hammer member biasing said hammer member towards said bit mounting member, dogs pivotally mounted in recesses in said outer sleeve, each dog including one free end adapted to engage the hammer member to maintain it in spring compressing position when said dog is in one extreme position of movement, each free end including an angularly disposed surface engageable by the lower edge of said bell member to free the dog from hammer member restraining position in the lowermost position of said hammer member, each dog including another free end adapted to be engaged by said bit mounting member when in the other extreme position of movement to pivot said dog into hammer member engaging position, and means for connecting said bell member to a cable.

CARL C. KOELN.

REFERENCES CITED

The following references are of record in the file of this patent:

UNITED STATES PATENTS

| Number | Name | Date |
|---|---|---|
| 1,697,570 | Mecom | Jan. 1, 1929 |
| 1,745,351 | Bishop | Feb. 4, 1930 |
| 1,810,391 | Boynton | June 16, 1931 |
| 2,252,912 | Armentrout | Aug. 19, 1941 |
| 2,371,498 | Boynton | Mar. 13, 1945 |

FOREIGN PATENTS

| Number | Country | Date |
|---|---|---|
| 152,651 | Germany | June 20, 1904 |